B. R. HOISINGTON.
TRACTION GANG PLOW.
APPLICATION FILED JAN. 27, 1909.

951,121.

Patented Mar. 8, 1910.
10 SHEETS—SHEET 8.

Witnesses.
A. H. Opsahl.
R. P. Wicks.

Inventor.
Benjamin R. Hoisington
By his Attorneys.
Williamson & Merchant

UNITED STATES PATENT OFFICE.

BENJAMIN R. HOISINGTON, OF MINNEAPOLIS, MINNESOTA.

TRACTION GANG-PLOW.

951,121.      Specification of Letters Patent.      Patented Mar. 8, 1910.

Application filed January 27, 1909. Serial No. 474,417.

*To all whom it may concern:*

Be it known that I, BENJAMIN R. HOISINGTON, a citizen of the United States, residing at Minneapolis, in the county of Hennepin and State of Minnesota, have invented certain new and useful Improvements in Traction Gang-Plows; and I do hereby declare the following to be a full, clear, and exact description of the invention, such as will enable others skilled in the art to which it appertains to make and use the same.

My invention relates to traction gang plows, and has for its especial object to provide a plowing rig of very large capacity, and wherein a large number of plows may be easily and quickly manipulated.

Generally stated, the invention has for its object to increase the efficiency of these traction gang plows.

The invention consists of the novel devices and combinations of devices hereinafter described and defined in the claims.

The tractive or driving force may be supplied either by a steam engine or by an explosive engine.

As one of the important features of the invention, I provide steam or air actuated rotary or oscillatory motors for independently raising the plows from operative into inoperative positions, and in connection therewith, I provide valve mechanism of novel construction for controlling these motors.

Other features of the invention are directed to the improvement of the truck mechanism, and particularly to improved steering mechanism, or means for controlling horizontal oscillatory movements of certain of the truck wheels.

The invention also involves various other novel features of construction which will hereinafter appear, and will be defined in the claims.

In the accompanying drawings which illustrate the invention, like characters indicate like parts throughout the several views.

Referring to the drawings: Fig. 19 is a vertical section taken approximately on the line $x^{19}$ $x^{19}$ of Fig. 1, showing in detail, the construction of the motor controlling valve.

Figure 1:
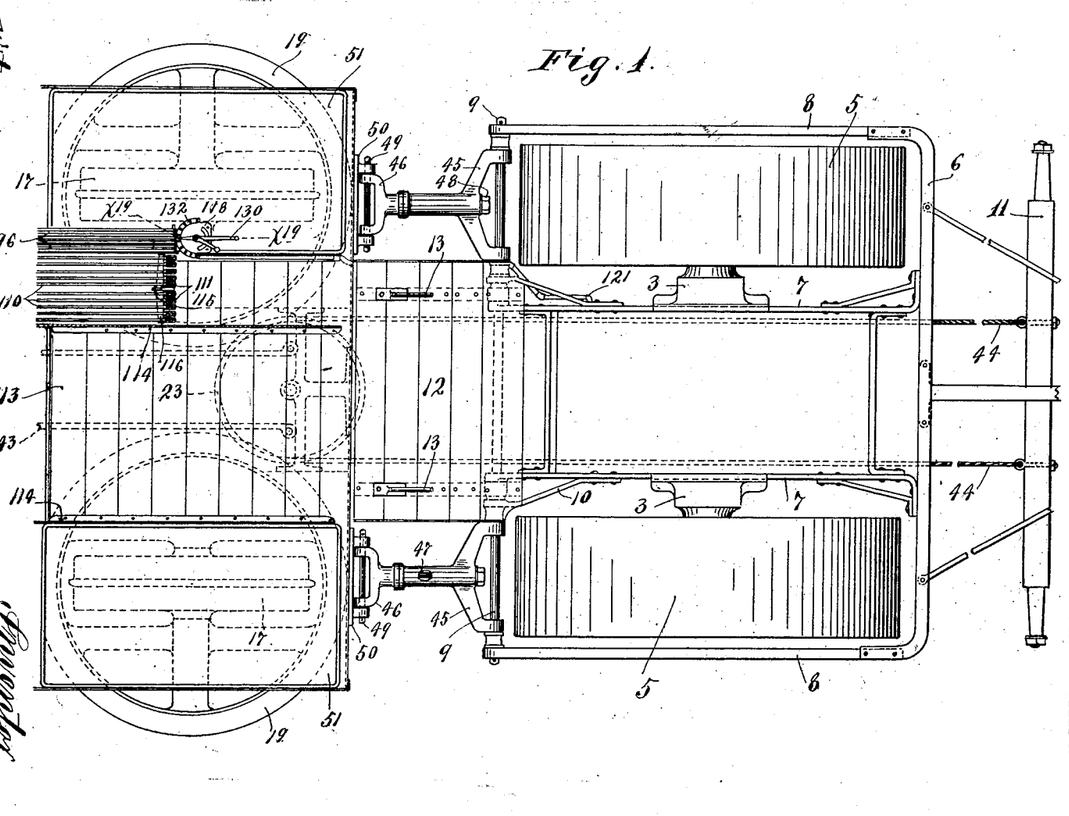
Figures 1 and 1$^a$ are supplemental plan views, showing the complete traction gang plow, with some parts broken away and with some parts removed from Fig. 1.
Figure 1A:
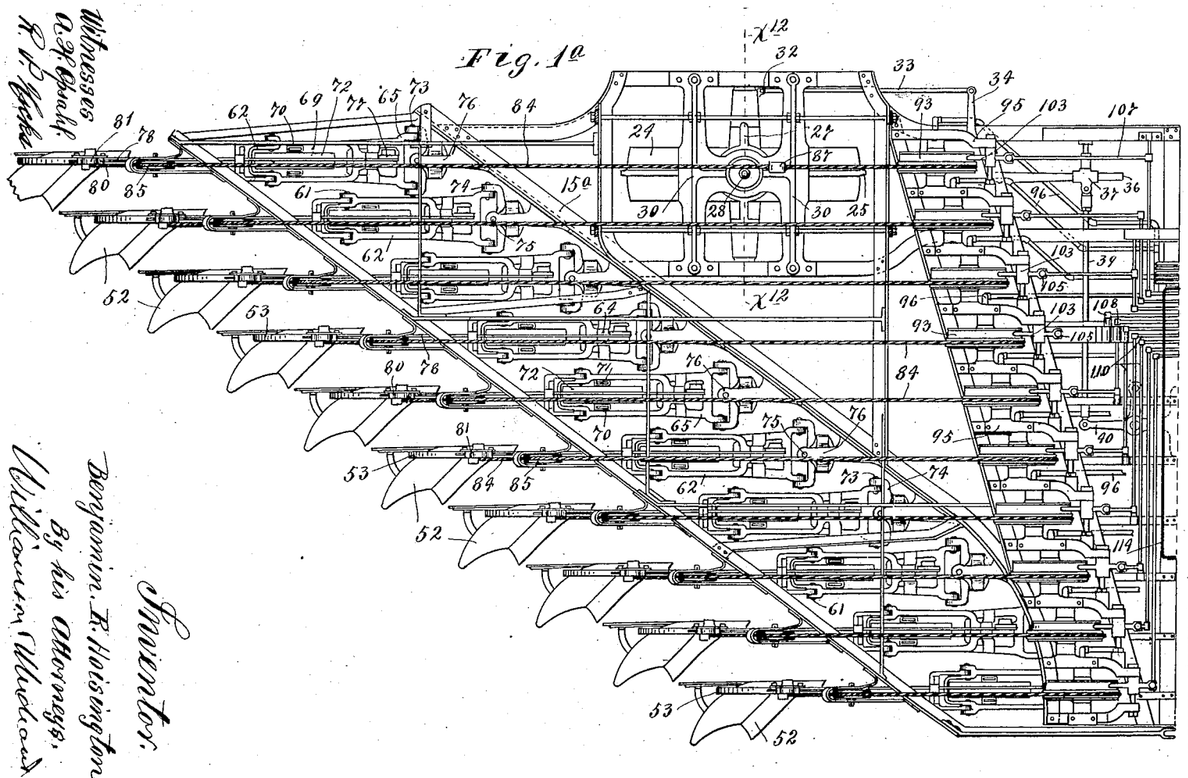
Figure 2:
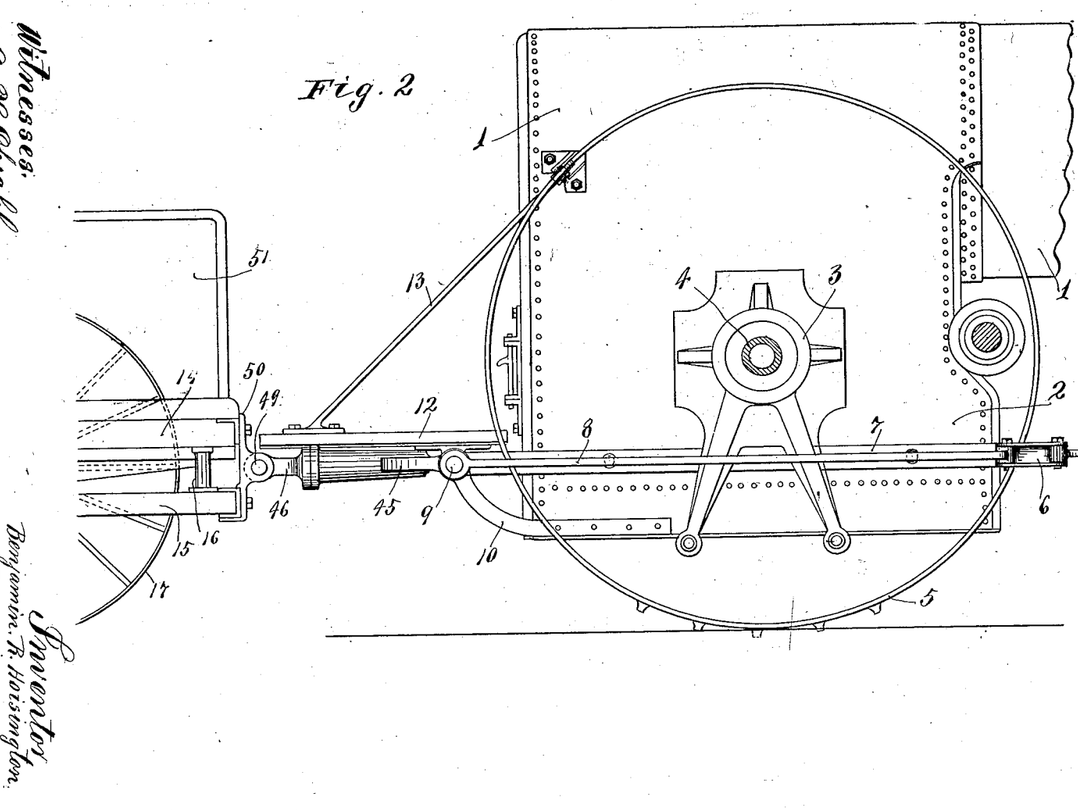
Figs. 2 and 2$^a$ are supplemental views in side elevation, showing the traction gang plow, some parts being sectioned, some parts being broken away, and some parts being shown in diagram only on Fig. 2.

In the drawings, I have shown a steam engine for supplying the motive power. This engine is of the locomotive type and involves a boiler 1 having the customary fire box 2, to the sides of which are rigidly secured heavy cast brackets 3, having trunnions 4 upon which the traction wheels 5 are journaled. The driving gear for transmitting motion from engine proper to the traction wheels, is not shown, but may be of the customary construction. The engine truck frame is shown as secured to and supported from the fire box 2 and embraces the wheels 5. Of the parts thereof, it is only necessary to note the transverse front beam 6, inner draw bars 7 and outer draw bars 8. Said beam 6 is preferably made from a heavy piece of channel iron, to the rearwardly turned end of which, the front ends of the outer bars 8 are bolted or otherwise rigidly secured. Just back of the wheels 5, a heavy transversely extended rod 9 is passed through the rear ends of the draw bars 7 and 8, and as shown, also through the rear ends of the heavy metal straps 10 secured to the sides of the fire box, as best shown in Figs. 1 and 2. This frame construction is therefore, such that the pull is from the front end of the fire box, and is transmitted to the rod 9 both inside and outside of the wheels, and the wheel axles 4 are independent of this frame and the outer ends thereof are relieved from this pulling strain.

In Fig. 1, the front axle of the engine truck is diagrammatically illustrated and is indicated by the numeral 11. This axle is of the usual construction, is mounted for horizontal pivotal movement, and by the usual steering connections, not shown, will steer the engine in its traveling movement. The engine platform 12, which is at the rear of the fire box, is suitably supported by the rod 9 and by oblique base rods 13 connected thereto, and to the upper side portions of the fire box.

Figure 2A:
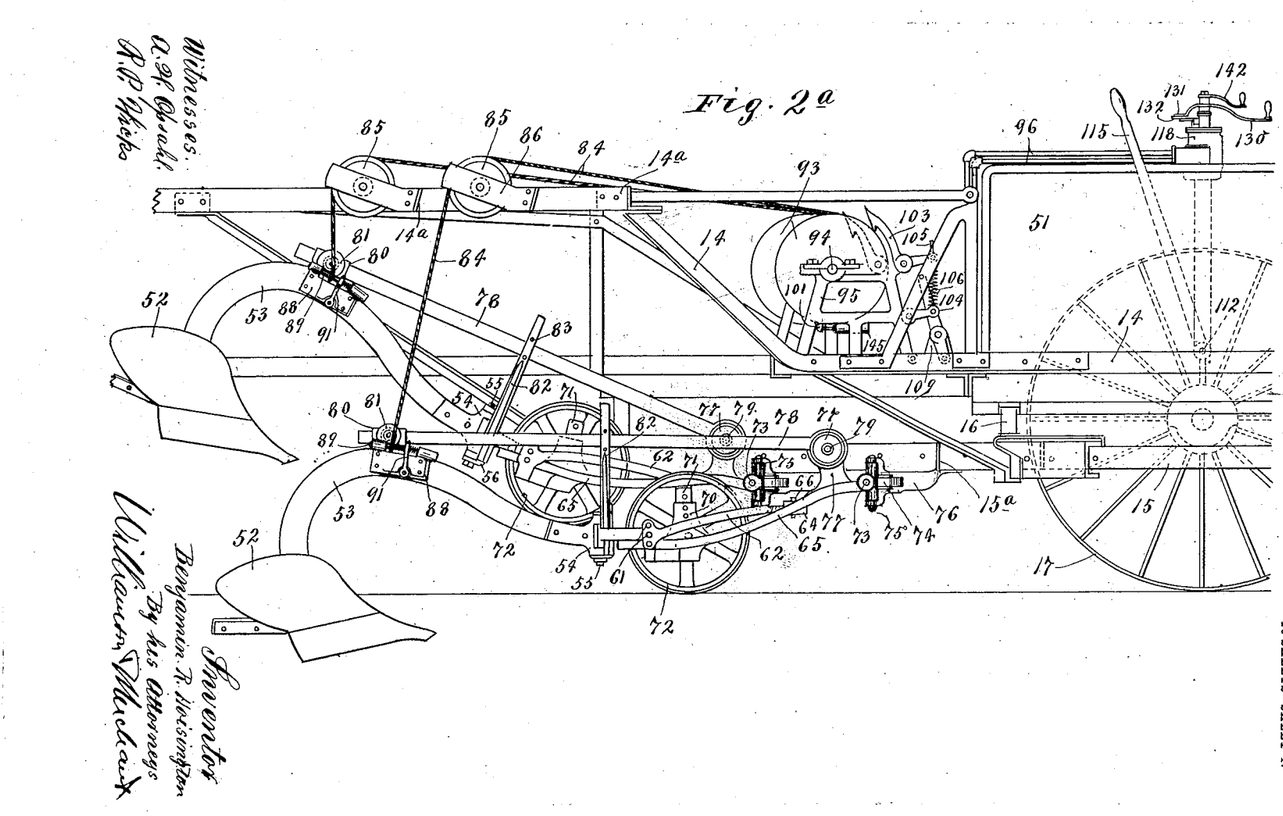
Figure 3:
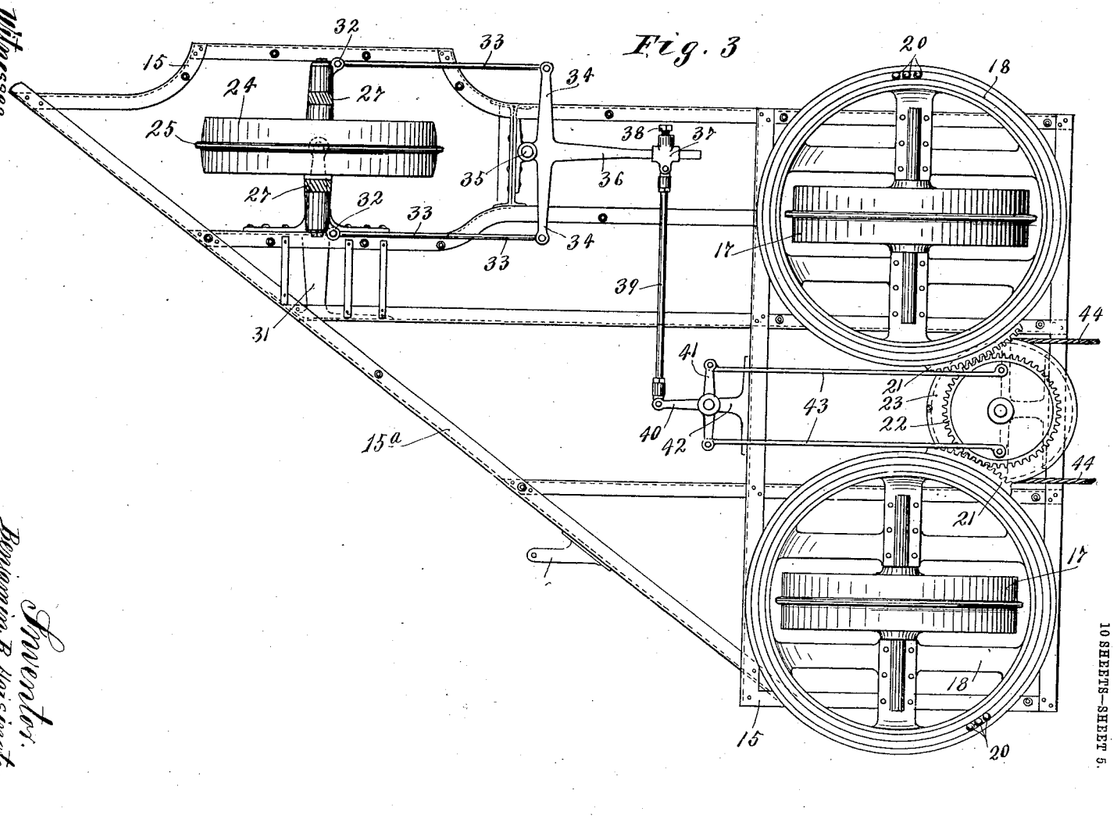
Fig. 3 is a view chiefly in plan, but with some parts sectioned and some parts broken away, showing the lower portion of the frame, the truck wheels and wheel steering devices of the mechanism shown in Figs. 1$^a$ and 2$^a$, the plows and the lifting motors and their connections being removed.
Figure 4:
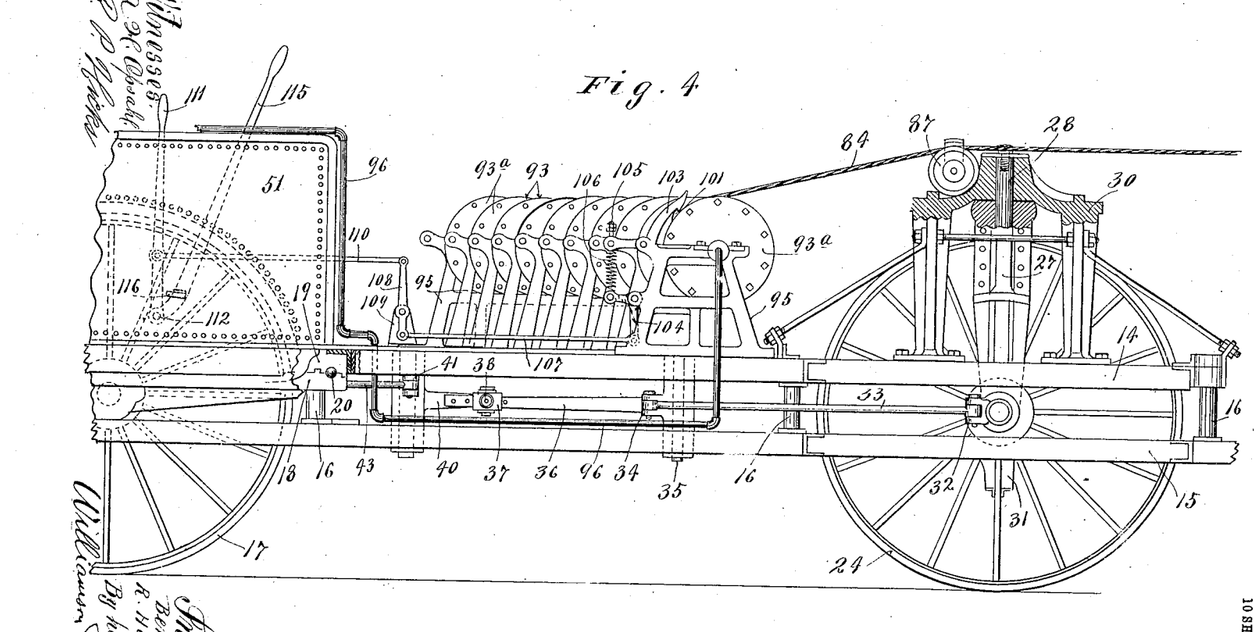
Fig. 4 is a left side elevation, with some parts sectioned and some parts broken away, showing the intermediate portion of the track mechanism, and showing also the several plow lifting motors.
Figures 5, 6, 7, 8:
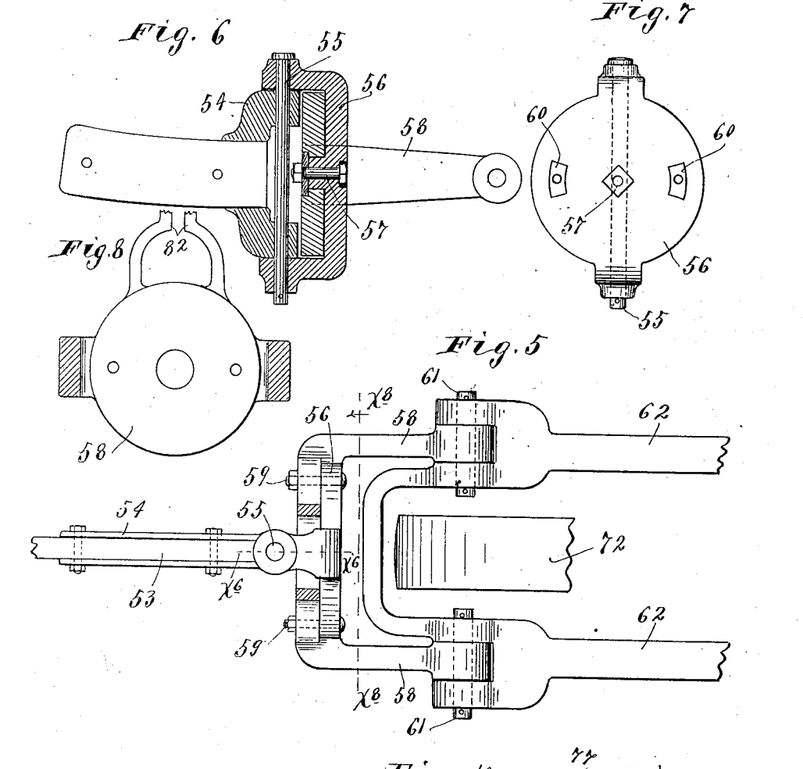
Fig. 5 is a plan view with some parts sectioned and some parts broken away, showing one of the so called supplemental draw bars and knuckle joint connection between the same and the coöperating plow beam.
Fig. 6 is a vertical section taken approximately on the line $x^6$ $x^6$ of Fig. 5.
Fig. 7 is a front elevation of the parts shown in Fig. 6, some parts being sectioned.
Fig. 8 is a transverse vertical section taken on the line $x^8$ $x^8$ of Fig. 5.
Figures 9, 10, 11:
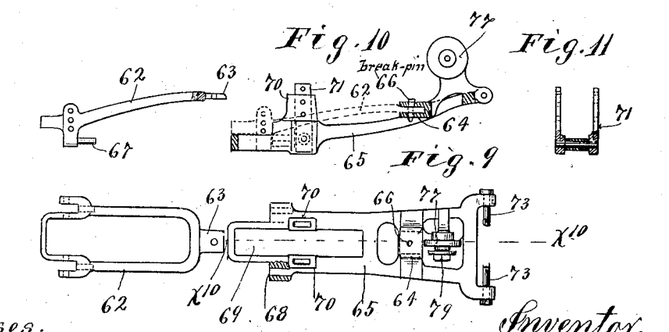
Fig. 9 is a plan view with some parts broken away, showing the main and supplemental sections of one of the plow drag bars or frames drawn apart or separated.
Fig. 10 is a view partly in side elevation and partly in vertical section on the line $x^{10}$ $x^{10}$ of Fig. 9.
Fig. 11 is a detail view partly in front elevation and partly in vertical section, showing one of the axle brackets, which are used to adjustably connect the gage wheels to the respective plow drag bars.

The frame of the plow truck in plan view is approximately triangular, and the plows are arranged on an oblique line in respect to the direction of travel. Furthermore, this triangular frame is supported by three wheels, all of which are connected for horizontal oscillatory movements for steering purposes. Directing attention particularly to Figs. 1ª, 2ª, 3 and 4, it will be noted, that the said triangular construction is made up of trussed upper and lower metal frames 14 and 15 rigidly connected by tie posts or members 16. The wide portion of this truck frame 14—15 is located in the front, and is supported by a pair of truck wheels 17, that are journaled in horizontally disposed annular frames 18. These annular frames 18 are capable of horizontal oscillatory movements, and coöperate with overlying annular bearings 19 rigidly secured to the upper section 14 of the said truck frame. Ball bearings 20, see Fig. 4, are preferably interposed between the annular bearing members 18 and 19. Suitable means, not shown, will of course, be provided for preventing separation of said members 18 and 19. Segmental spur gears 21 shown in Fig. 3, are secured to the peripheries of the relatively movable bearing members 18 and mesh with an intermediate spur gear 22. This gear 22 is secured to a sheave or drum 23, which in turn, is mounted in suitable bearings on the frame sections 14 and 15.

Figures 12, 13, 17, 18:
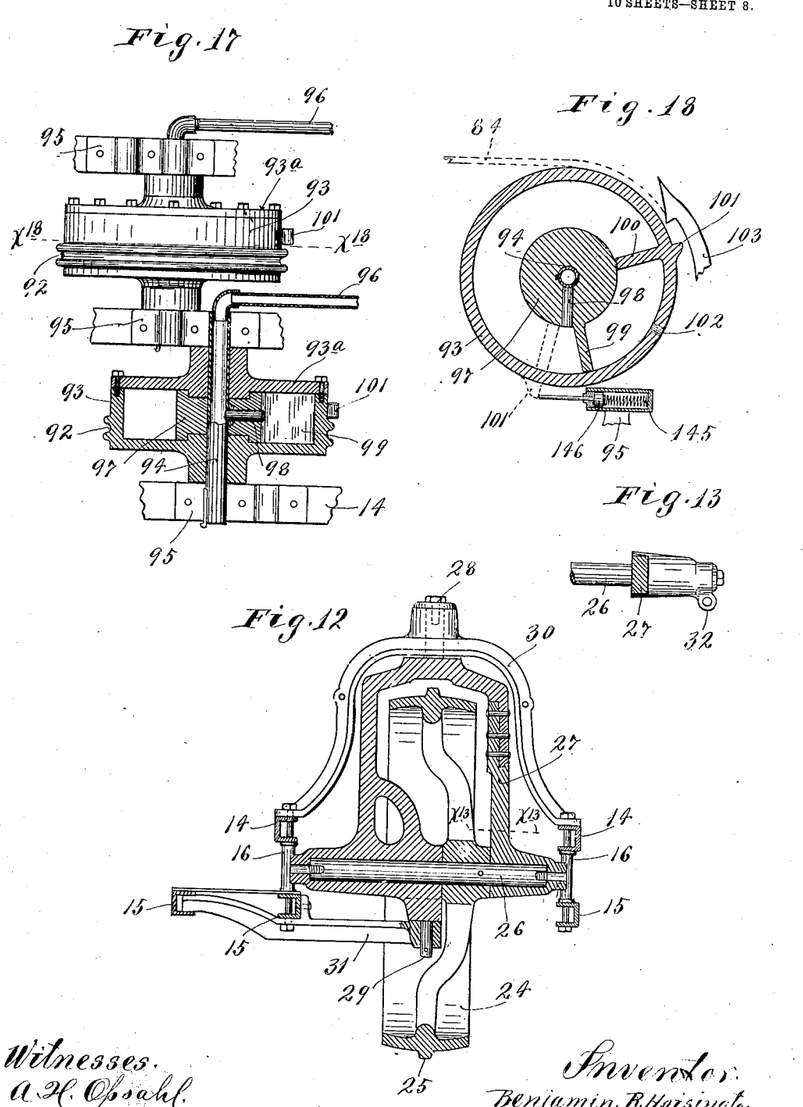
Fig. 12 is a vertical section taken approximately on the line $x^{12}$ $x^{12}$ of Fig. 1$^a$.
Fig. 13 is a detail in horizontal section on the line $x^{13}$ $x^{13}$ of Fig. 12, some parts being removed.
Fig. 17 is a view partly in plan and partly in horizontal section, showing two of the oscillatory plow lifting motors.
Fig. 18 is a vertical section taken on the line $x^{18}$ $x^{18}$ of Fig. 17.

The rearwardly extended and contracted portion of the truck frame 14—15 is supported by a single wheel 24, preferably provided with a peripheral flange 25, which prevents lateral slipping thereof on the ground. This wheel 24 has a laterally offset hub that is rigidly secured to an axle 26, see particularly Fig. 12. This axle 26 is journaled in the lower end portions of an approximately U-shaped wheel bracket 27, that is provided with upper and lower trunnions 28 and 29, which trunnions are axially alined with each other on a line that vertically intersects the axis of said shaft at the transverse center of said wheel. The upper trunnion 28 is journaled in an arch bearing bracket 30 that is rigidly secured to bars of the upper frame section 14. The lower trunnion 29 is journaled in a bearing 31 that is rigidly secured to bars of the lower frame section 15. The prongs of the wheel bracket 27, see Figs. 3 and 13, are shown as provided with perforated lugs 32, to which the rear ends of coupling rods 33 are pivotally connected. The front ends of these rods 33 are pivotally connected to the end of a lever 34 that is intermediately pivoted to bearings 35 secured to the frame 14—15. Also said lever 34 is provided with a centrally located forwardly projecting arm 36, upon which a sliding head 37 is secured by means of a set screw 38, or other suitable device. The head 37 is connected to one end of a rod 39, the other end of which is connected to the arm 40 of a lever 41, which latter is intermediately pivoted to bearings 42 on the frame 14—15. The opposite ends of the lever 41 are connected by rods 43 to the gear 22 on opposite sides of its axis.

By the steering connections just described, it is evident, that oscillatory movements of the gear 22 and sheave 23 will impart simultaneous oscillatory movements in the same direction to the two wheels 17 and to the third wheel 24. By adjustments of the head 37 on the lever arm 36, the wheel 24 may be set parallel to the wheels 19, or it may be set at a slight angle thereto so that it will crowd either toward or from the "land side" of the machine, and thereby adapt the machine to work in either direction on a side hill.

The above required oscillatory movements of the gear 22 and sheave 23 are preferably imparted from the front axle 11 of the engine truck, and as shown, this is accomplished by a cable 44 wound on and secured to said sheave, and secured at its ends to the said front axle on opposite sides of its pivot, see Figs. 1 and 3.

Figures 14, 15, 16, 17:
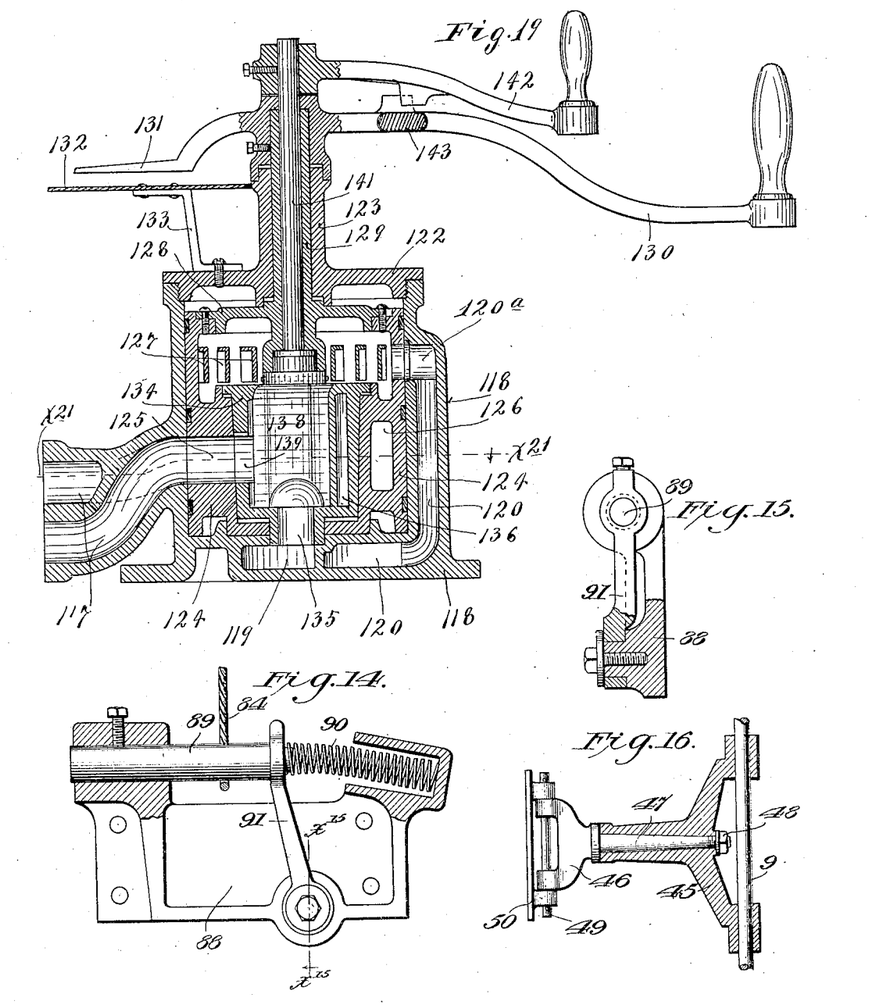
Fig. 14 is a detail view partly in side elevation and partly in vertical section, showing means for detachably connecting the plow beams to their respective lifting cables.
Fig. 15 is an end elevation of the parts shown in Fig. 14, some parts being sectioned on the line $x^{15}$ $x^{15}$ of said Fig. 14.
Fig. 16 is a view partly in plan and partly in horizontal section, showing one of the pair of universal coupling links used to connect the rear end of the engine truck frame to the front end of the plow truck frame.

Directing attention now to Figs. 1, 2 and 16, it will be seen that the rear end of the engine frame is connected to the front end of the plow truck frame by universal coupling links which permit independent lateral rocking movements so as to adapt themselves to irregularities in the surface of the ground. These coupling links as preferably constructed, comprise forked members 45 and 46, the latter of which have stems 47 swiveled in the former and secured thereto by nuts 48 or other suitable means. The prong ends of the link members 45 are pivoted on the transverse rod 9 of the engine truck frame, while the prong ends of the link members 46 are pivotally connected by pins 49 to the lugs of bearing plates 50, which latter are rigidly secured to both sections 14 and 15 of the plow truck frame.

Water to supply the boiler is preferably carried by a pair of tanks 51, see Figs. 1 and 4, which are mounted on the frame of the plow truck above the wheels 17 and have concaved bottoms that clear said wheels.

The plow connections to the frame of the plow truck are best illustrated in Figs. 1ª, 2ª, and Figs. 6 to 11 inclusive. These plows 52, which as already stated, are located on an oblique line to the line of draft and the direction of travel, are rigidly secured to the rear ends of plow beams 53. These plow beams, at their front ends, have rigidly secured forked heads 54 that are pivotally connected by vertical pins 55 to the prongs of vertically extended clevises 56. Each clevis 56 is interlapped with and pivotally connected at 57, to a horizontally extended clevis 58. Short nutted bolts 59 rigidly secure the coöperating clevises 56 and 58 in any set adjustment. The head of the clevis 56, being provided with segmental slots 60, which permit pivotal or swivel adjustments of said clevis 56, and hence, of the plow beam and plow on the horizontal axis of the pivotal connection 57. The forwardly projecting arms of the clevis 58 are pivotally connected by horizontal pivot pins 61 to the rear end portion of a yoke like supplemental section 62 of the corresponding drag bar. At its forward end, this supplemental section or yoke 62 has a perforated lug 63 that fits into a seat formed between flanges 64 of the main section 65 of the two part plow drag bar. A pin 66 preferably of hard wood and which may be sheared under less strain than required to break the plow or any part of the drag bar proper, is inserted through coincident seats and the said lugs 63 and flanges 64. The supplemental bar section 62, at its rear portion, is provided with forwardly projecting dowel pins 67 that engage seats 68 in the rear portion of the main bar section 65, and are adapted to freely pull out of said seats when the safety pin 66 is sheared by any abnormal strain. The main bar 65 has a large longitudinally extended passage 69 that alines with the opening in the yoke or supplemental section 62, when the said parts 62 and 65 are connected. At the sides of the opening 69, the bar 65 is provided with vertically perforated bearings 70, in which the legs of a vertically adjustable wheel axle-bracket 71 are seated. The legs of the bracket 71 and the upper portions of the bearings 70 have vertically spaced perforations, so that by means of bolts or pins, the said axle-bracket may be set in any desired vertical adjustment in respect to the rear portion of the bar 65. Gage wheels 72 are journaled on the spindles of the respective axle-brackets 71, and work freely in the openings or wheel passages of the respective drag bars or bar sections 62 and 65. The front of each main drag bar 65 is provided with laterally spaced hinge lugs that are pivotally connected by pins 73 to the prongs of horizontally disposed coupling heads 74, which in turn are intermediately connected by vertical pivots 75 to heavy lug brackets 76 bolted or otherwise rigidly secured to the oblique bar 15ª. In Fig. 3, only one of these lug brackets 76 is shown as in position on the said bar 15ª.

The main drag bars 65, near their forward ends, (see Figs. 1ª, 2ª, 9 and 10) are provided with heavy upwardly extended lugs 77, to which the forward ends of spring bars 78 are pivotally connected, as shown, by headed screws 79. These spring bars 78 are set edgewise in vertical planes, and their rear ends are held against twisting movements by, but are movable endwise through, bearings 80, which in turn are pivotally connected to heavy lugs or bearings 81 riveted or otherwise rigidly secured to the intermediate upwardly bowed portion of the respective plow beams 53. The intermediate portions of the spring bars 78 work between the laterally spaced upwardly extended prongs 82, see Figs. 2ª, 5 and 8, of the respective clevises 58. These spring bars 78 tend to hold the plow beams 53 in straight alinement with their respective drag bars 62—65, but permit the plows to be freely raised and lowered. By inserting a pin or bolt 83 through one of several perforations in the guiding prongs 82, the buckling movement of the plow connection on the pivot pins 61 when the plow is raised, may be limited so that under extreme upward movement of the plow, its gage wheel 72 will be raised from the ground as indicated in one instance in Fig. 2ª. It will, of course, be understood, that when the spring bar 78 is engaged with the respective pin 83 and the plow is moved farther upward, the drag bars 62—65 will move pivotally on its pivot pin or connection 73.

The vertical pivots 75 permit the drag bars 62—65 to swing laterally, and the vertical pivots 55 permit the plows further and additional lateral swinging movements. Otherwise stated, the plows are, by the above noted pivot joints, so mounted that they may turn in the furrow to avoid or clear themselves of obstructions without requiring the entire body of the plow to be forced laterally and bodily to one side. Also they permit the plows to be bodily forced laterally without changing their direction in respect to the line of travel. The pins 83 are so placed in the guide prongs 82, that the plows may be moved out of the ground without raising their gage wheels 72 from the ground; and when the plows are thus raised, the spring bars 78 hold the same in central positions so that the plows will not swing laterally into engagement with each other, even when on a side hill.

When the plows are raised into the extreme position shown in one instance in Fig. 2ª, and the gage wheels 72 are raised from the ground, the entire plowing rig may be readily backed up.

The connections for lifting the plows are best shown in Figs. 1ª, 2ª, 4, 14, 17 and 18. Each plow is lifted by a flexible connection preferably in the form of a cable 84. The intermediate portions of these cables run over guide sheaves 85, mounted in bearing brackets 86, secured to the oblique bar 14ª of the upper truck frame section 14. One of these cables also runs over a guide sheave 87 mounted on the upper portion of the arched wheel bearing bracket 30, as best shown in Fig. 4. At their rear ends, the cables 84 are detachably connected by a novel device best shown in Figs. 2ª, 14 and 15, to the intermediate portions of the respective plow beams 53. This detachable coupling involves a bracket 88 riveted or otherwise rigidly secured to the plow beam, and provided with a pair of lugs, to one of which a stud 89 is secured, and the other having a recess that receives one end of a coiled spring 90. This spring 90 normally holds the free end of a retaining arm 91 against the end of the stud 89, the other end of said stud being pivotally connected to said bracket 88. The respective cable 84 is looped at its lower end around the stud 89. The bracket 88 and the cable holding device above described are shown as applied to the lower end of the plow, but removed from the raised plow in Fig. 2ª. When the plows are connected to their drag bars, the pull of the cable 84 is approximately straight upward, and approximately at a right angle to the coupling stud 89. When however, a plow is torn loose from its drag bar by shearing of its safety pin 66, the cable will slide forward on the stud 89, and, engaging the free end of the lever 91, will move the latter against the tension of its spring 90, thereby automatically releasing the said cable from the disconnected plow and thus preventing the cable from being broken.

At their forward ends, each plow lifting cable 84 is attached to, and adapted to be wound upon the grooved portion 92 of an oscillatory or rotary motor drum 93, as best shown in Figs. 1ª, 2ª, 17 and 18. As already stated, there is one of the rotary or oscillatory motors for each plow. Preferably, each motor drum 93 is provided with a detachable side or head 93ª, as best shown in Fig. 17, and these drums are mounted to rotate upon tubular shafts 94 that are keyed or otherwise rigidly secured in suitable bearings 95 secured on the plow truck frame section 14. One end of each tubular shaft 94 is closed, and the other end is connected to a steam or air supply pipe 96. Rigidly secured to each tubular shaft 94 and closely fitting within the coöperating drum 93, is a cylindrical hub 97, that has a radial port 98 leading from the perforation in the central portion of the said tubular pipe. The fixed hub 97 has a radially projecting blade like abutment 99 that closely fits the sides and internal cylindrical surface of the drum 93. The said drum 93 has a propelling blade 100 that closely engages the cylindrical surface of the non-rotary hub 97. Also the drum 93 is formed with a peripheral lock lug 101 and a peripheral escape passage 102.

When the plow is raised to its highest position, shown in Fig. 2ª, the lug 101 of the corresponding motor is engaged and held by a lock dog 103, that is pivotally connected to the corresponding bearing 95. A bell crank 104 pivoted to the same bearing 95, is connected by a rod 105 to a projecting arm of the corresponding lock dog 103, and a compression spring 106 on said rod yieldingly holds the said lock dog in an operative position. The lower arm of the bell crank 104 is connected by a rod 107 to the lower end of a lever 108, which as shown, is intermediately pivoted to a bearing 109 on the upper frame section 14, as best shown in Fig. 4. The upper ends of the levers 108 are connected by rods 110 to hand levers 111, which at their lower ends, are pivotally connected at 112 to suitable bearings on the platform 113 (see Fig. 1), of a plow truck. Also, it may be here noted, that the said platform 113 carries a coal receptacle or hopper between the tanks 51. One side of this coal receptacle 114 is spaced apart from the adjacent tank 51 so as to leave standing place on the platform 113, and also room for the series of levers 111.

By independent operation of the levers 111, the lock dogs 103 may be independently released from the lock lugs 101, so as to independently drop the plows to working positions. In connection with these several levers 111, I provide a so-called master lever 115, see Figs. 1 and 4, also pivoted at 112, but provided near its lower end with a transverse bar 116 that is adapted to engage with all of the levers 111 so that when the said master 115 is moved forward, all of the levers 111 will be moved forward, and hence all of the plows, simultaneously dropped into operative positions. The so called supply pipes 96, which lead one to each plow actuating motor, as already described, also serve the function of exhaust pipes. At their receiving ends, see Figs. 19 and 21, they are shown as assembled in two horizontal rows, and are each independently connected to distributing ports 117 of the main casting 118 of the so called motor controller. In its lower portion, the casting 118 is shown as formed with an exhaust passage 119 that opens to the atmosphere, and with a live steam passage 120 that is connected by a suitable pipe 121 to the boiler 1. This pipe 121 is shown in part in Figs. 1 and 21, and it should be provided with a flexible joint or section such as steam hose so that it will not be damaged by independent rocking movements of the trucks of the traction engine, and of the plow structure. The steam passage 120 leads upward in the casting 118 and opens into the upper portion thereof through a port 120ª. The top of the chamber in the casting 118 is closed by a detachable head 122, having a sleeve or long hub 123.

Rotatively mounted in the chamber of the casting 118, is an annular primary valve 124 having a radially extended distributing port 125, and as shown, being cored out at 126 to lighten the same. The chamber in the upper portion of the annular valve 124, is perforated at its sides as indicated at 127, so as to always keep the said chamber in communication with the steam supply port 120ª. The top of the chamber in said valve 124 is closed by a head 128, having a tubular sleeve 129 journaled in the hub 123 of the head 122.

Figure 20:
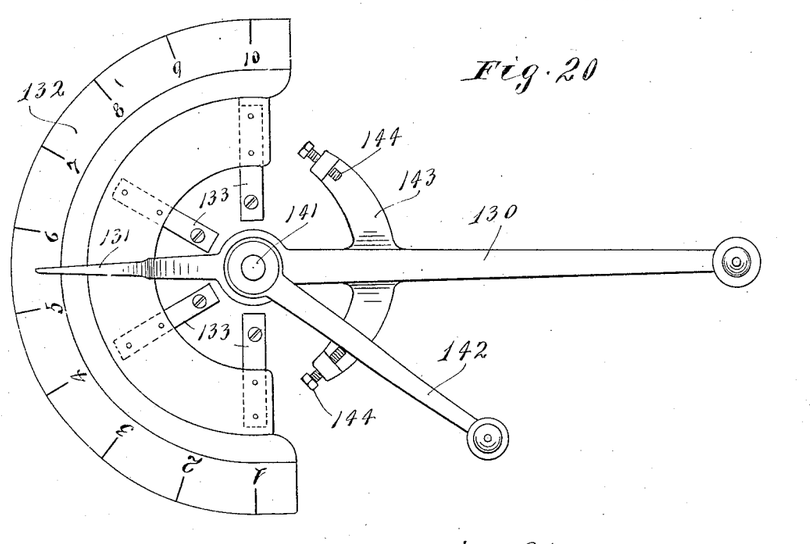
Fig. 20 is a plan view of the lever mechanism for the so called motor controlling valve.
Figure 21:
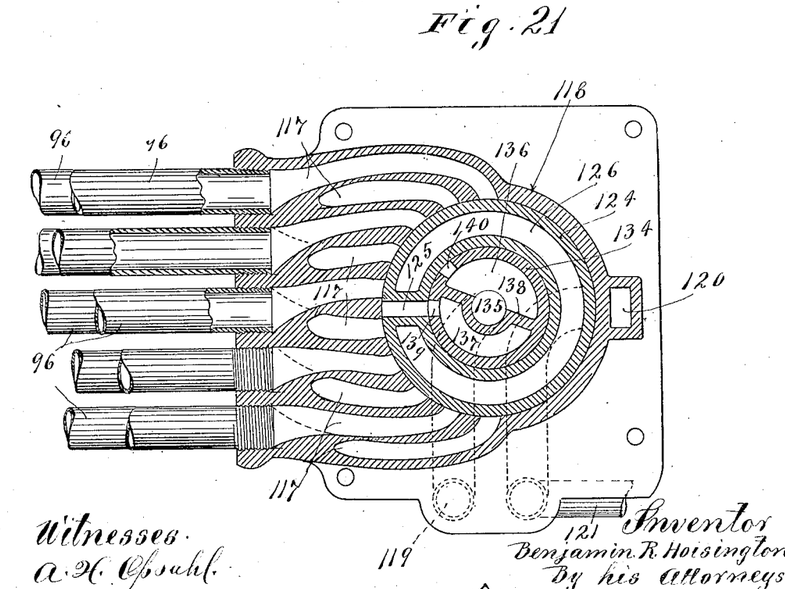
Fig. 21 is a horizontal section taken approximately on the line $x^{21}$ $x^{21}$ of Fig. 19.

A primary controlling lever 130 is secured to the upper end of the sleeve 129 and serves to operate the primary valve 124. The lever 130 is provided with a pointer 131 that co-operates with a marked dial or scale 132, to indicate which of the distributing ports 117 is in registration with the single distributing port 125 of the oscillatory primary distributing valve 124. As shown, this scale 132 is supported from the head 122 by brackets 133. In Figs. 20 and 21, the port 125 is shown as out of registration with all of the ports 117.

Rotatively mounted within the so called primary valve 124, is a so called secondary valve 134, having at its lower end a hollow trunnion 135 that is always in communication with the exhaust passage 119. This secondary valve 134 is divided into two compartments, to-wit, an exhaust chamber 136, and a live steam chamber 137, see Figs. 19 and 21, by means of a vertical partition 138. At its lower end, this partition 138 is bulged laterally so that the steam chamber 137 is cut off from the hollow trunnion 135, and the exhaust chamber 136 is connected therewith. At its upper end, the said partition 138 is horizontally extended so that it closes the upper portion of the exhaust chamber 136 and it leaves the upper extremity of the steam chamber 137 in constant communication with the chamber in the upper portion of the primary valve 124, and through the perforations 127, with the admission port 120ª. On opposite sides of the partitions 138, a secondary valve 134 is provided with two ports 139 and 140. The port 139 is an admission port adapted to establish communication between the steam chamber 137 and the distributing port 125 of the primary valve 124, while the port 140 is an exhaust port adapted to establish communication between said distributing port 125 and the exhaust chamber 136.

The upper end portion of the secondary valve 134 is connected to the headed lower end of a vertical stem 141 mounted in the sleeve 129, and provided at its projecting upper end with a secondary controlling lever 142. The secondary valve 134 must have sufficient oscillatory movement in respect to the primary valve 124, to move either of its ports 139, 140 into registration with the distributing port 125 of said primary valve. To control such valve movements, the primary controlling lever 130 is shown as provided with oppositely projecting arms 143, in the ends of which stop screws 144 are adjustably mounted. These stop screws 144 limit the movements of the lever 142 in respect to the lever 130, and by adjustments thereof, the said levers may be so set as to give full port opening or anything less than full port opening desired when the lever 142 is moved against one or the other of the stop screws 144. When the said lever 142 is moved against the nearest stop screw 144 as shown in Fig. 20, the live steam port 139 will be registered with the common distributing port 125, as shown in Fig. 21. If the two controlling valves 124 and 134 be then moved together, and the port 125 be brought into registration with any one of the several ports 117, live steam will be admitted into the drum of the corresponding plow-lifting motor, and the steam confined between the two blades 99 and 100 will rotate the drum in the proper direction to wind up the corresponding cable 84, and lift the connected plow. The plow may be raised slightly above the ground and again dropped entirely by the control of the supply of steam to the drum 93, but to drop the plow, requires the secondary valve 134 to be so moved that its support 140 will register with the distributing port 125, while the latter is still in communication with the said port 117.

To lift the plow into the upper position shown in Fig. 2ª, requires the drum 93 to be rotated as far as shown by full lines in Fig. 18, and in this position, the corresponding lock dog 103 will engage with the lug 101 and lock the said drum against backward rotation and consequently, positively hold the plow in the said raised position indicated. If the steam be left turned on too long, the drum will be rotated until the escape passage 102 passes the stationary blade 99, whereupon the live steam will escape through said passage and thereby prevent the drum blade 100 from being forced against the said fixed blade 99.

When the drums 93 are locked by the lock dogs 103, and the plow is to be lowered, it is, of course, necessary, first to move the said lock dog into its releasing position. This, as before stated, may be accomplished by independent manipulations of the individual levers 111, so that the said plows may be successively or otherwise independently lowered; or by movement of the master lever 115, all of the plows may be simultaneously released and dropped into working positions.

To cushion the extreme movements of the drums 93 and hence, the downward movement of the plows, cushioning devices or buffers are provided. These cushioning devices are preferably constructed as shown in Fig. 18, wherein the numeral 145 indicates a cylinder or dash pot rigidly secured to the corresponding bearing 95, and the numeral 146 indicates a piston spring pressed within the said cylinder, with its stem projecting in position to be engaged by the lever 101 when the said drum 93 is rotated to the position indicated by dotted lines on Fig. 18.

What I claim is:

1. The combination with a truck and a multiplicity of plows, each having its own individual connection to said truck, a series of independently operative fluid actuated motors connected each to one of said plows for lifting the same, and a common controller for said motors operative to throw said motors into action in succession in the desired order.

2. The combination with a truck and a multiplicity of plows connected thereto, of fluid actuated motors provided with windlass drums, cable connections between said lass drums and plows, lock devices operative on drums and plows, lock devices operative on said drums for holding said plows raised, a series of levers with connections for independently releasing said lock devices, and a common lever operative on said lock devices through said series of independent levers for simultaneously releasing said lock devices.

3. The combination with a truck and a multiplicity of plows connected thereto, of motors with connections for lifting said plows, and a common controller for said motors operative to throw said motors into action successively, in any desired order.

4. The combination with a truck and a multiplicity of plows connected thereto, of fluid actuated motors with connections for lifting said plows, and a common controller valve mechanism for said motors comprising a primary and a secondary valve, arranged to be set so that common movement thereof in a constant direction, will throw said motors successively into action, and arranged to be set in another position, so that common movements thereof will hold all the said motors inoperative.

5. The combination with a truck and a multiplicity of plows connected thereto, of rotary fluid actuated motors having windlass drums, cables connecting said drums to said plows, and a common controller valve mechanism for said motors comprising primary and secondary valves, and devices for indicating the position of said primary valve and secondary valve.

6. The combination with a truck and a multiplicity of plows connected thereto, of fluid actuated motors with connections for lifting said plows, said motors having escape passages for limiting the extreme movements of the movable members thereof.

7. The combination with a truck and a multiplicity of plows connected thereto, of rotary fluid actuated motors with connections for lifting the said plows, lock devices for securing said plows in raised positions, means for releasing said lock devices, and buffers for limiting the extreme movements of the movable members of said motor.

8. The combination with a truck and a multiplicity of plows connected thereto, of rotary motors with connections for lifting said plows, the movable members of which motors have lock shoulders, lock dogs operative on said shoulders to lock said plows in raised positions, and buffers operative on said lock shoulders to cushion the extreme movements of the movable members of said motors.

9. The combination with a truck, of drag bars pivotally connected to the truck frame for lateral swinging movements, plows having their beams connected to said drag bars for lateral swinging movements, and yielding means tending to hold said drag bars alined with their respective plow beams.

10. The combination with a truck, of drag bars connected to the truck frame, plows having their beams connected to said drag bars for lateral swinging movements, and yielding means tending to hold said plow beams laterally alined with said drag bars.

11. In a gang plow, the combination with a truck and plows connected thereto with freedom for lateral swinging movements, of laterally acting yielding means tending to hold said plows in intermediate positions.

12. The combination with a truck and a multiplicity of plows, of drag bar connections between the truck frame and plow beams permitting lateral and swinging movements of the plows, said connections including vertically extended guides, and spring bars connected to the plow beam and to the drag bar connections, and working in said guides, and yieldingly holding the plow beams alined with said drag bar connections.

13. The combination with a truck and a multiplicity of plows, of drag bar connections between the truck frame and plow beams, said connections having vertically extended guides, and spring bars attached to said plow beam and drag connections, working in said guides, yieldingly holding the plow beams laterally alined with the drag bar connections, and serving to limit the downward buckling movements of said plow beams and drag bar connections.

14. The combination with a truck, of yoke like drag bar connections connected to the truck frame and provided with gage wheels located in the openings of the respective guide bars, and plows connected to said drag bars at the rear of said gage wheels.

15. The combination with a truck and a multiplicity of plows, of drag bars connecting the plow beams to the truck frame, and comprising main and supplemental sections, both of which are yoke shaped, and the latter of which is detachable from the former, and gage wheels connected to the primary sections of said drag bars in the openings thereof and of said supplemental sections, whereby said supplemental drag bar sections when torn loose, will pass over said gage wheels.

16. The combination with a truck and a multiplicity of plows, of drag bars pivotally connected to the truck frame and to the plow beams, and gage wheels connected to, and supporting the rear portions of said drag bars, and vertically adjustable in respect thereto to vary the depth of the furrow.

17. The combination with a truck and a multiplicity of plows, of yoke like main and supplemental drag bars connected by a safety device and pivotally connecting the plow beams to the truck frame, axle brackets adjustably connected to the rear end portions of the main drag bars, and gage wheels journaled on said axle brackets and working in the openings of the coöperating main and supplemental drag bars.

18. A plow drag bar made up of main and supplemental sections, connected by a safety pin, and one of the parts having longitudinally extended dowel pins loosely seated in the other part.

19. The combination with a truck and a multiplicity of plows, of drag bars connecting the plow beams to the truck frame and made up of primary and supplemental sections, connected by a safety pin, and one of said sections having longitudinally extended dowel pins engageable with seats in the other section.

20. The combination with a truck and a multiplicity of plows, of drag bars proper, connected at their forward ends to the truck frame, and a pair of clevises for each drag bar rigidly but adjustably connected to each other for swivel movements, and one thereof being pivotally connected to the coöperating drag bar, and the other being pivotally connected to the coöperating plow beam.

21. The combination with a truck and a multiplicity of plows, of drag bars proper pivotally connected at their forward ends to the truck frame, gage wheels supporting the rear ends of said drag bars, and a pair of interlapped clevises for each drag bar rigidly but adjustably connected together for swivel movements, one of said clevises being pivotally connected to the coöperating drag bar, and the other being pivotally connected to the coöperating plow beam.

22. The combination with an engine truck frame and a plow truck frame, of a pair of links connected to the two truck frames by horizontal pivots, each link being made up of a pair of telescoped members capable of swivel movements, permitting independent transverse rocking and vertical movements of the two truck frames.

23. A truck frame supported by two transversely opposite front wheels and a rear wheel, and connections for imparting simultaneous oscillatory steering movements to said wheels, and including means for varying the angle of said rear wheel in respect to said front wheel.

24. The combination with a truck frame and wheels for supporting the same, of horizontally disposed oscillatory frames having openings in which certain of the truck wheels are located, and means for imparting oscillatory steering movements to said wheels.

25. The combination with an approximately triangular truck frame, of two wheels supporting said frame in front and one wheel supporting said frame at the rear, said wheels being mounted for oscillatory steering movements, gears connecting said front wheels for common steering movements, a three armed lever mounted on said frame in front of the rear wheel and having two of its arms connected to said rear wheel axle on the opposite side of said wheel, a rod adjustably connected to the third arm of said lever, a second three armed lever mounted on said frame, and to one arm of which the other end of said rod is connected, and a pair of rods connecting the other two arms of said second lever to an intermediate gear of the gear connection between said front wheels.

26. The combination with a truck and a plow connected thereto by a disruptible drag bar connection, of a plow lifting device arranged to be automatically released when said drag bar connection is separated.

27. The combination with a truck, of a multiplicity of plows and disruptible drag bar connections between the plow beams and truck frame, of plow lifting devices comprising lifting cables and couplings between said cables and plow beams, which couplings automatically release said cables when the said drag bar connections are separated and the plows drop to the rear.

28. The combination with a truck and a multiplicity of plows connected thereto by disruptible drag bar connections, of coupling bracket secured to the plow beams and provided with stud like projections, spring pressed lock levers normally held against the ends of said stud like projections, motors for lifting said plows, and lifting connections from said motors to said plows, including cables having loops or rings normally held on the stud like projections of said coupling brackets, but adapted to press the coöperating spring held levers out of position, and thereby automatically release said cables when said draft bar connections are separated.

29. The combination with a truck frame and an arched bearing bracket secured thereto, of a yoke like wheel bearing connected to said arched bearing and to said truck frame by vertically alined pivots, and a truck wheel having an offset hub journaled to both of the depending portions of said yoke like wheel bearing, with its transverse center located in the vertical plane of the pivotal connections of said wheel bearing.

In testimony whereof I affix my signature in presence of two witnesses.

BENJAMIN R. HOISINGTON

Witnesses:
ALICE J. SWANSON,
HARRY D. KILGORE.